(12) United States Patent
Park et al.

(10) Patent No.: US 7,717,201 B2
(45) Date of Patent: May 18, 2010

(54) UNDERCARRIAGE HAVING SHOCK ABSORPTION FUNCTION

(75) Inventors: Dong-hwa Park, Busan (KR); Joon-il Cho, Busan (KR); Jin-gyu Seon, Busan (KR)

(73) Assignee: Dong-Il Rubber Belt Co., Ltd. (KR)

( * ) Notice: Subject to any disclaimer, the term of this patent is extended or adjusted under 35 U.S.C. 154(b) by 810 days.

(21) Appl. No.: 11/296,096

(22) Filed: Dec. 6, 2005

(65) Prior Publication Data

US 2006/0267304 A1 Nov. 30, 2006

(30) Foreign Application Priority Data

May 26, 2005 (KR) ...................... 10-2005-0044559

(51) Int. Cl.
*B62D 55/104* (2006.01)
(52) U.S. Cl. .................. 180/9.5; 180/9.1; 180/89.1; 280/124.1
(58) Field of Classification Search .................. 180/9.5, 180/9.1, 89.3; 280/124.1, 124.107, 124.177; 305/116, 120, 122, 124, 194
See application file for complete search history.

(56) References Cited

U.S. PATENT DOCUMENTS

| | | | | |
|---|---|---|---|---|
| 1,317,650 A | * | 9/1919 | Holt | ............................ 305/194 |
| 2,978,050 A | * | 4/1961 | Risk et al. | ..................... 180/9.5 |
| 3,012,624 A | * | 12/1961 | Lich | ............................ 180/9.5 |
| 4,501,139 A | * | 2/1985 | Petersen | ................... 73/117.01 |
| 4,733,855 A | * | 3/1988 | Balczun et al. | ............. 267/294 |
| 4,995,598 A | * | 2/1991 | Ingham | ....................... 267/293 |
| 5,286,044 A | * | 2/1994 | Satzler et al. | .............. 280/28.5 |
| 5,661,995 A | * | 9/1997 | Fagerdahl | ..................... 72/457 |
| 5,676,356 A | * | 10/1997 | Ekonen et al. | ............. 267/294 |
| 6,170,588 B1 | * | 1/2001 | Irino et al. | .................. 180/89.1 |
| 6,340,201 B1 | * | 1/2002 | Higuchi | ................. 296/190.07 |
| 2003/0127257 A1 | * | 7/2003 | Porubcansky et al. | ........ 180/9.1 |
| 2004/0262877 A1 | | 12/2004 | Sellers | |

* cited by examiner

*Primary Examiner*—Tony H. Winner
*Assistant Examiner*—Maurice Williams
(74) *Attorney, Agent, or Firm*—Swanson & Bratschun, L.L.C.

(57) ABSTRACT

Disclosed is an undercarriage having a shock absorption function, including a pair of roller frames facing each other, each roller frame having a plurality of vibration-proof rollers inside thereof, at a lower portion thereof, a main frame disposed between the roller frames and provided with a turn table at a center portion thereof, and a shock absorption bridge for connecting the main frame to the roller frame. According to the present invention, vibration-proof rollers are installed inside a roller frame instead of conventional rollers and the shock absorption bridge is fixed between the main frame and the roller frame, thereby absorbing an external shock in two steps and thus enhancing ride comfort.

4 Claims, 8 Drawing Sheets

UNDERCARRIAGE HAVING SHOCK ABSORPTION FUNCTION

RELATED APPLICATIONS

This application claims priority to Korean patent application no. 10-2005-0044559, filed May 26, 2005, entitled "Undercarrige Having Shock Absorption Function", which application is incorporated herein in its entirety.

BACKGROUND OF THE INVENTION

1. Field of the Invention

The present invention relates to an undercarriage used for construction equipment, and more particularly, to an undercarriage having a shock absorbing function which is implemented by a vibration-proof roller provided inside a roller frame instead of a conventional roller, and a shock absorbing bridge which serves to absorb a shock applied to the undercarriage and is fixed between a main frame and the roller frame, in which the undercarriage can enhance ride comfort of the construction equipment by minimizing an external shock.

2. Description of the Related Art

Generally, an undercarriage is a set of lower drive parts of construction equipment such as excavator for supporting an upper part of the construction equipment and is provided with a rubber track, an endless chain.

FIG. 12 illustrates a perspective view of a conventional undercarriage and FIG. 13 illustrates a right side view of a track roller attached to the conventional undercarriage. Referring to FIG. 12 and FIG. 13, a main body of the undercarriage is integrated into a single body and is made of steel.

The conventional undercarriage has a plurality of track rollers (their mounted status is not shown in figures) disposed inside a roller frame 20a in which each of the track rollers is enclosed by a conventional rubber track.

The roller frame 20a and a main frame 50a are connected via a body bridge 40a. The main frame 50a has a hole at the center portion thereof, and a turn table 70a is provided in the hole.

The conventional undercarriages are found in crawler-type vehicles such as construction equipment, and their structure is well known to people skilled in the related arts. Accordingly, detailed description on the structure of the conventional undercarriage will be omitted.

The above conventional undercarriage does not have a shock absorber. Accordingly, in use of construction equipment such as an excavator provided with a steel endless track, a shock generated due to the condition of the surface of road and caused to the undercarriage is transferred to an operator of the excavator. For such reason, the excavator operator easily gets tired and operation efficiency of the excavator decreases.

Reason of the foregoing is thought that the undercarriage can not absorb a shock generated due to the roughness of the surface of road and thus all of the shock is transferred to the operator since the undercarriage is made of steel and integrated into a single body. The conventional undercarriage has a further problem that the excavator employing the undercarriage has a short life span due to the external shock.

SUMMARY OF THE INVENTION

The present invention, therefore, is provided to solve aforementioned problems and there is provided an undercarriage having a shock absorption function by employing a vibration-proof roller disposed inside a roller frame instead of a conventional roller and a shock absorbing bridge fixed between a main frame and the roller frame.

In order to achieve such objects of the present invention, according to one embodiment of the present invention, there is provided an undercarriage having a shock-absorption function, including a pair of roller frames facing each other, each roller frame having a plurality of vibration-proof rollers at a lower portion thereof, a main frame disposed between the roller frames and provided with a turn table at a center portion thereof, and a shock absorption bridge for connecting the main frame to the roller frame.

BRIEF DESCRIPTION OF THE DRAWINGS

The above and other features of the present invention will be described in reference to certain exemplary embodiments thereof with reference to the attached drawings in which.

DETAILED DESCRIPTION OF THE PREFERRED EMBODIMENT

The present invention will now be described more fully hereinafter with reference to the accompanying drawings, in which preferred embodiments of the invention are shown.

Figure 1:
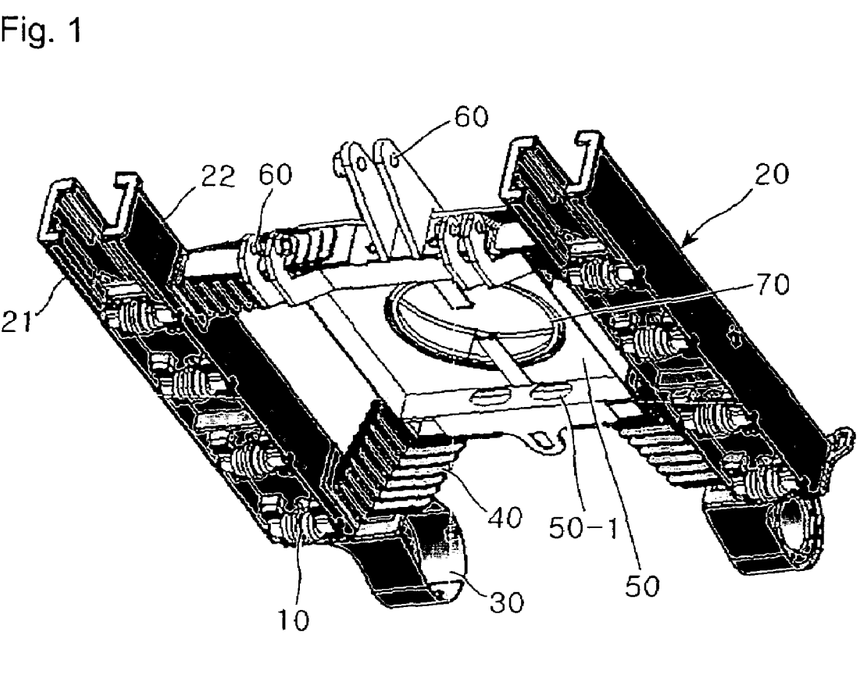
FIG. 1 is a perspective view illustrating an undercarriage having a shock absorption function, according to one embodiment of the present invention.
Figure 2:
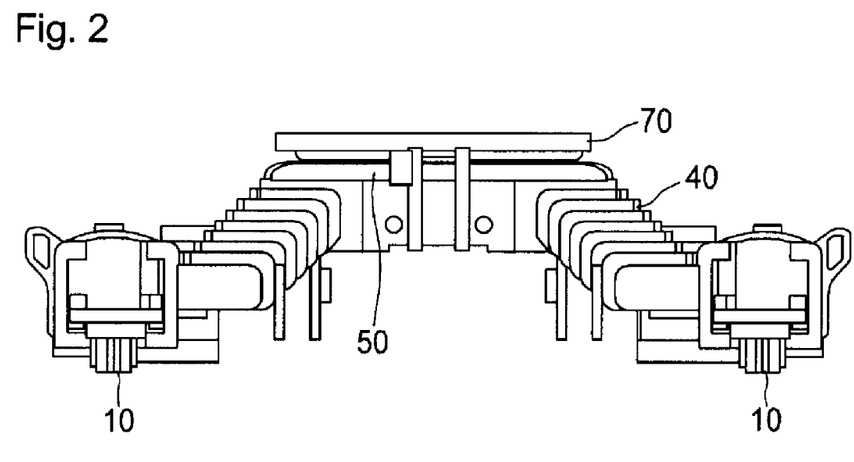
FIG. 2 is a front view illustrating the undercarriage having a shock absorption function, according to one embodiment of the present invention.
Figure 3:
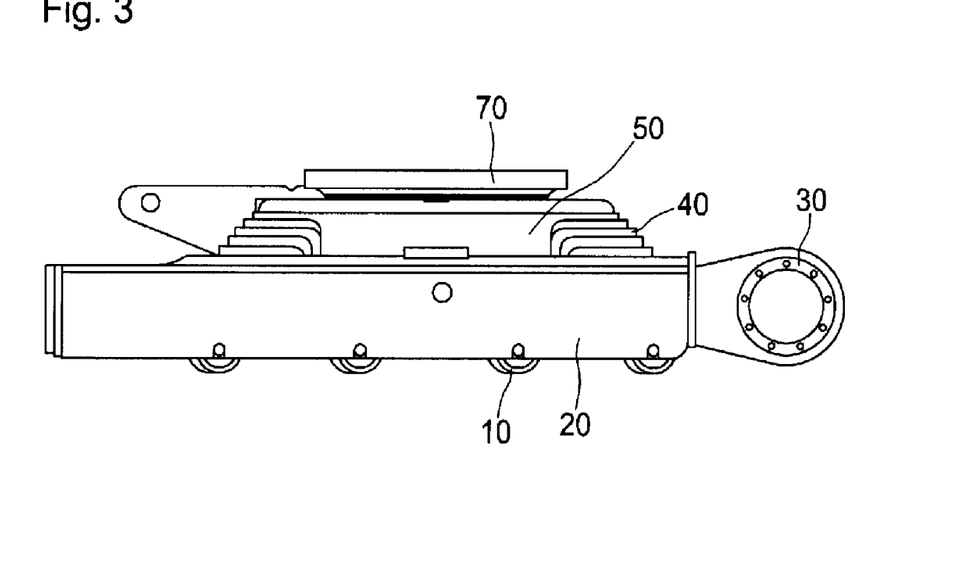
FIG. 3 is a right side view illustrating the undercarriage having a shock absorption function, according to one embodiment of the present invention.
Figure 4:
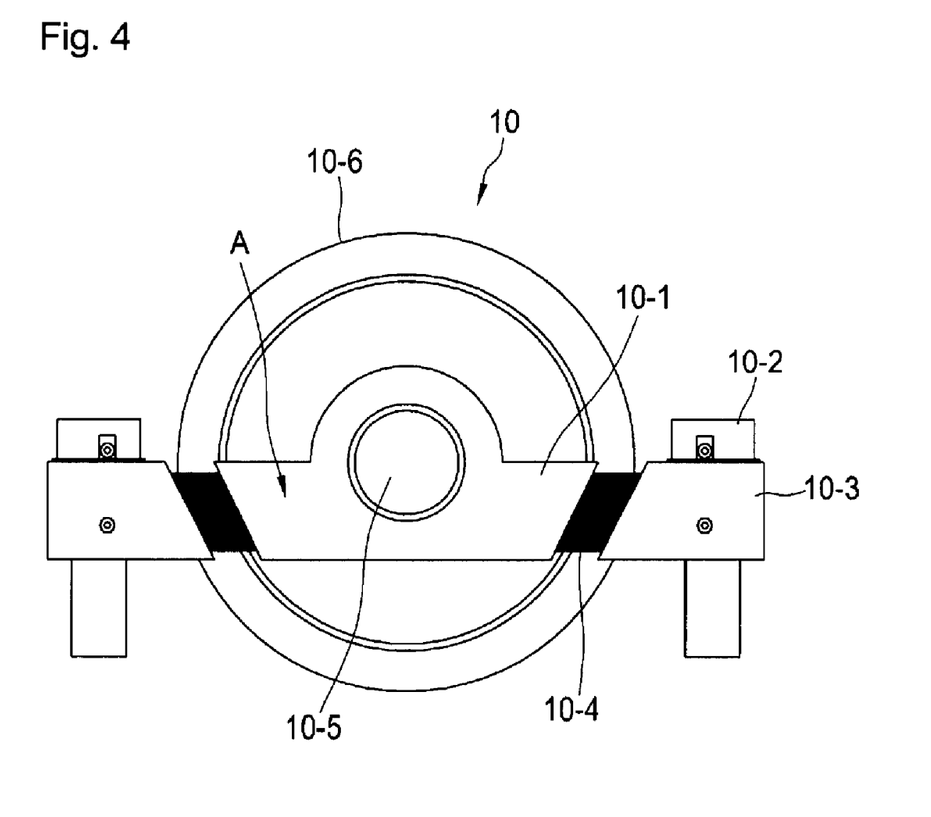
FIG. 4 is a front view illustrating a vibration-proof roller of the undercarriage having a shock absorption function, according to the present invention.
Figure 5:
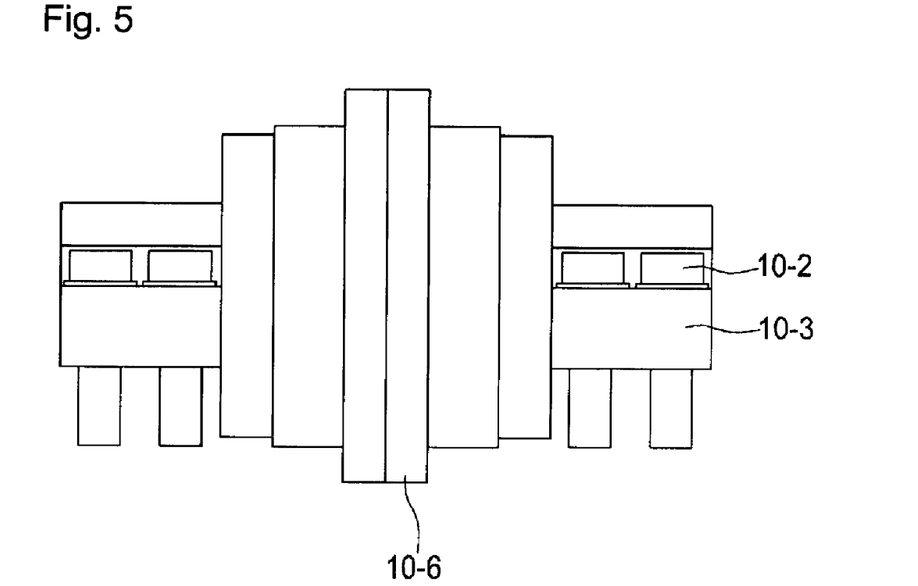
FIG. 5 is a right side view illustrating the vibration-proof roller of the undercarriage having a shock absorption function, according to the present invention.

FIG. 1 illustrates an undercarriage having a shock absorption function according to one embodiment of the present invention and FIGS. 2 to 5 are a plan view, a bottom view, a front view, and a right side view, respectively, of the undercarriage according to the one embodiment of the present invention.

Referring to FIGS. 1 to 5, the undercarriage according to the present invention includes a pair of roller frames 20, a main frame 50 disposed between the roller frames 20 which are facing each other such that it is movable in the vertical direction and the horizontal direction, and a shock absorption bridge 40 extending across a space between the main frame 50 and the roller frame 20.

The undercarriage further includes a plurality of vibration-proof rollers 10 installed inside a lower portion of the roller frame 20.

Hereinafter, each element constituting the undercarriage will be described in detail.

A pair of roller frames 20 comprises a pair of beams 21 which are facing each other and a connection bar 22 fixed between the beams 21. In each roller frame 20, that is, between the beams 21 of the roller frame 20, a plurality of vibration-proof rollers 10 is provided. The structure of the vibration-proof roller 10 will be described later.

The main frame 50 is installed between the roller frames 20 such that it is movable in the vertical direction and the horizontal direction by the shock absorption bridge 40. The main frame 50 has a dowser frame connection hole 60 and a high pressure hydraulic hose connection hole 50-1.

Figure 11:
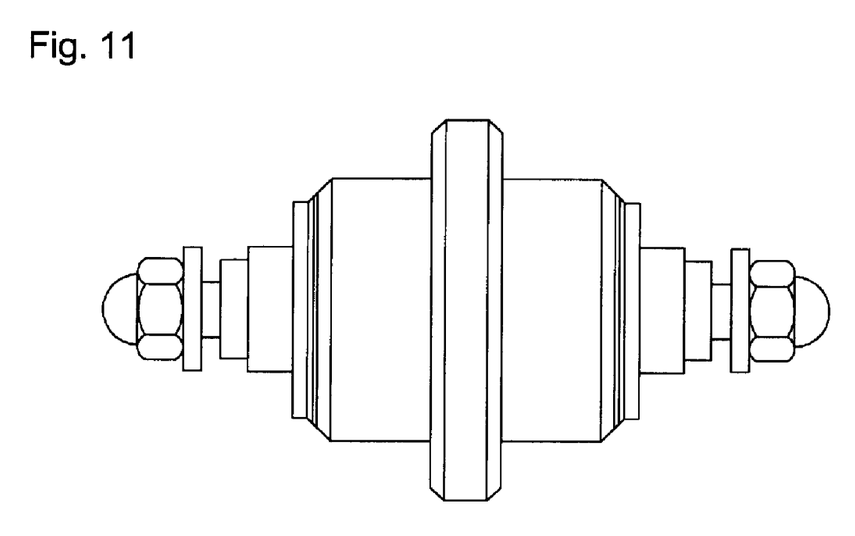
FIG. 11 is a right side view illustrating a track roller to be attached to the conventional undercarriage.

Referring to FIG. 11, the turn table 70 is mounted to a center portion of the main frame 50 and a vibration-proof rubber 70-1 is interposed between the turn table 70 and the main frame 50. An empty space 70-2 is provided under the turn table 70 and also serves to absorb a shock.

Figure 10:
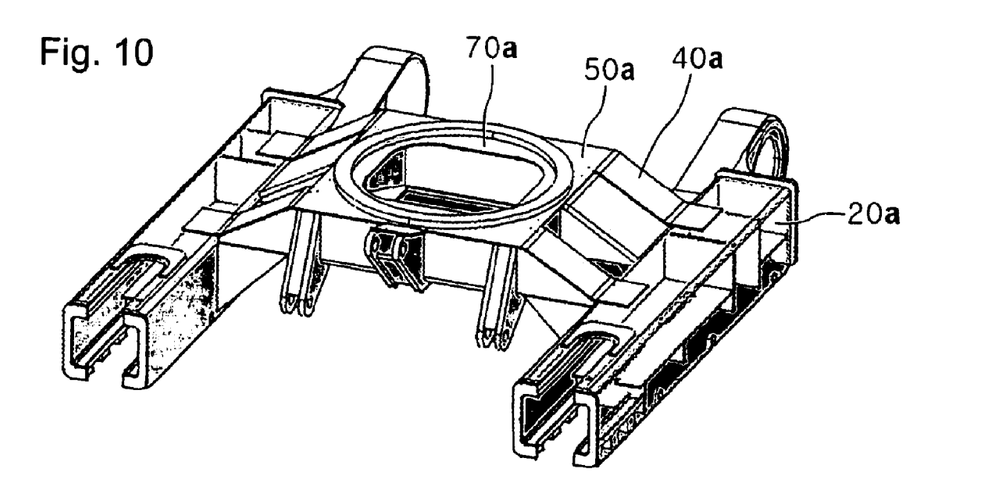
FIG. 10 is a perspective view of a conventional undercarriage.

The shock absorption bridge 40 is fixed to the roller frame 20 at its one side and to the main frame 50 at the other side thereof. Referring to FIG. 10, the shock absorption bridge 40 has a stacked structure in which a plurality of vibration-proof rubber plates 40-2 for bridge and a plurality of steel plates 40-3 are alternately stacked. In the shock absorption bridge 40, steel plates 40-1 and 40-4 form the outermost plates and are coupled to the roller frame 20 and the main frame 50, respectively. Reference numeral 30 denotes a motor casing.

Figure 6:
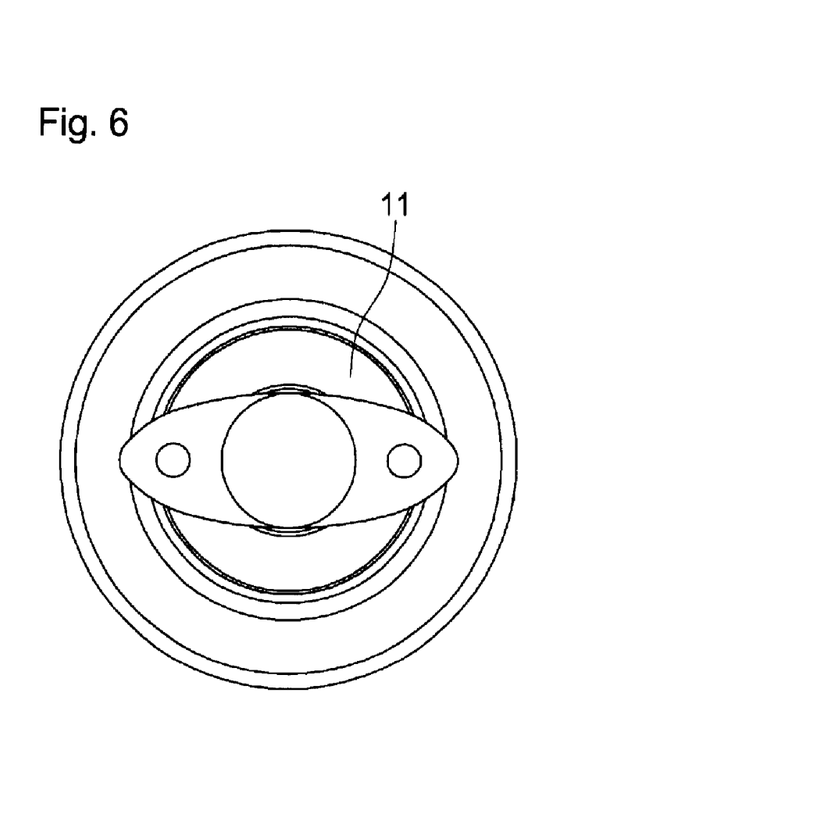
FIG. 6 is a front view illustrating a roller of an undercarriage having a shock absorption function, according to another embodiment of the present invention.
Figure 7:
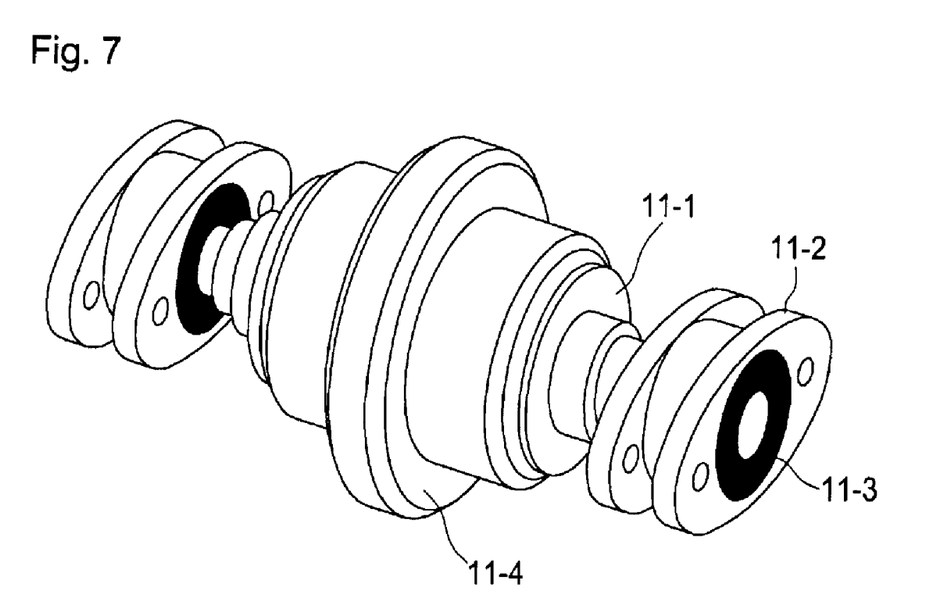
FIG. 7 is a right side view illustrating the roller of the undercarriage having a shock absorption function, according to another embodiment of the present invention.

FIG. 6 and FIG. 7 illustrate a front view and a right side view of the vibration-proof roller 10, respectively. The vibration-proof rollers 10 are installed between the beams 21. Referring to FIGS. 6 and 7, each vibration-proof roller 10 includes a cylindrical roller body 10-6, a roller shaft 10-5 installed to pass through the center of the cylindrical roller body 10-6, collar units 10-1 installed on both sides of the roller shaft 10-5 and provided with dove-tails A at its end portions, nuts 10-3 for supporting the dove-tails A and fixing the vibration-proof roller 10, and bolts 10-2 associated with the vibration-proof roller through the nuts 10-3, respectively. A vibration-proof rubber 10-4 for a roller is interposed between the collar unit 10-1 and the nut 10-3 for absorbing a shock. The nut 10-3 has a sloped side corresponding to the dove-tail A.

Figure 8:
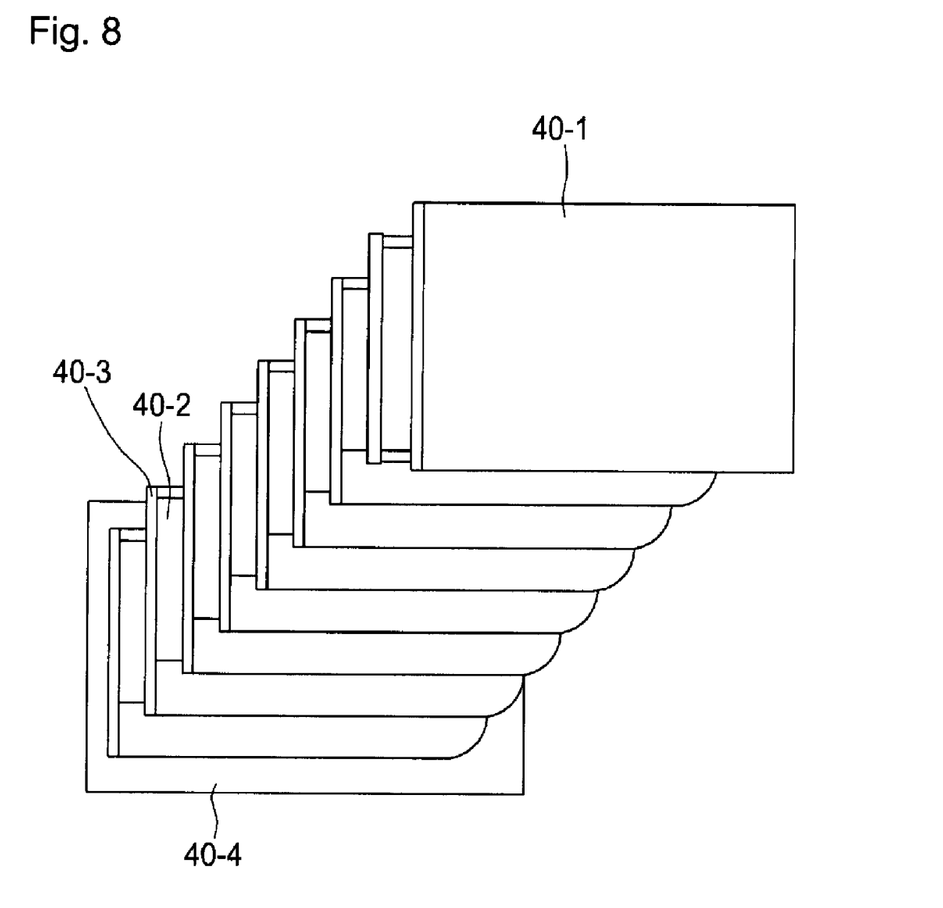
FIG. 8 is a right side view illustrating an undercarriage bridge of the undercarriage having a shock absorption function, according to the one embodiment of the present invention.
Figure 9:
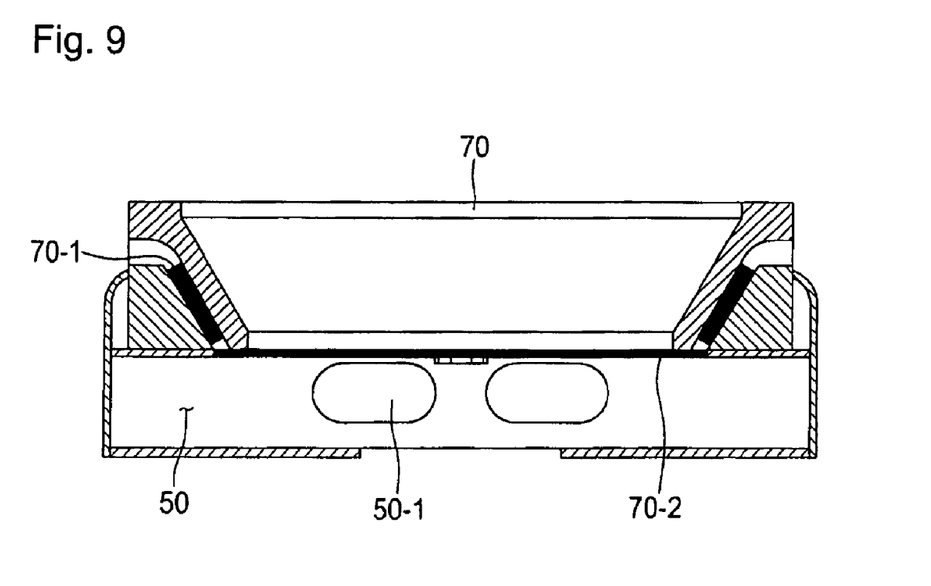
FIG. 9 is a sectional view illustrating a turn table of the undercarriage having a shock absorption function, according to the one embodiment of the present invention.

FIG. 8 and FIG. 9 illustrate an undercarriage having a shock absorption function, according to another embodiment of the present invention, wherein FIG. 8 is a front view and FIG. 9 is a right side view. Referring to FIGS. 8 and 9, the undercarriage according to another embodiment of the present invention has a vibration-proof roller 11. The vibration-proof roller 11 includes a cylindrical roller body 11-4, collar units 11-1 attached to both sides, respectively, of the roller body 11-4, a roller shaft 11-5 installed to penetrate the center of the roller body 11-4 and the collar units 11-1, and position fixation units 11-2 attached to the both end portions, respectively, of the roller shaft 11-5, each of the position fixation unit 11-2 having a vibration-proof rubber inside thereof. On the other hand, the position fixation unit 11-2 has a hole to be mated with a bolt, so that the vibration-proof roller 11 to be coupled to the roller frame 20 by the bolt.

Hereinafter, the shock absorbing operation of the undercarriage will be described.

In the case that a shock or a shake is caused to the undercarriage, the vibration-proof roller in the roller frame 20 primarily absorbs the shock or shake. There are two types of the vibration-proof rollers as described above.

In case of using the vibration-proof roller 10 shown in FIG. 6, a shake applied to the undercarriage in the vertical direction and the horizontal direction is absorbed by the vibration-proof rubber 10-4 for roller disposed between the dove-tail A and the nut 10-3.

In case of using the vibration-proof roller 11 shown in FIG. 8, the vibration-proof rubber 11-3 attached to the position fixation unit 11-2 primarily absorbs a shock. Then, the vibration-proof rubber plates 40-2 for bridge of the shock absorption bridge secondarily absorb the remaining of the shock. Since the shock absorption bridge 40 has a structure in which the vibration-proof rubber plates 40-2 for bridge and the steel plates 40-3 are alternately stacked, the shock is effectively absorbed by the shock absorption bridge 40. Then, the vibration-proof rubber 70-1 for turn table, attached to under the turn table 70, finally absorbs the remaining of the shock. Further, due to the empty space 70-2 under the turn table 70, the shock is more effectively absorbed.

The undercarriage according to the present invention has at least the following advantages.

First, it is possible to enhance operator's ride comfort, ensure stability of construction equipment and increase life span of construction equipment not only by absorbing a shock generated due to roughness of the surface of road when driving the construction equipment but also by inhibiting transfer of vibration generated from an upper part of the construction equipment during its operation to a lower part of the construction equipment.

Second, it is possible to enhance operator's ride comfort with respect to construction equipment and enhance durability of construction equipment by alleviating stepwise a shock generated due to the roughness of the surface of road and bad operation condition of the construction equipment while operating the construction equipment having the undercarriage.

Third, it is possible to enhance operation efficiency of construction equipment by enhancing operator's ride comfort of the construction equipment and enhancing durability of construction equipment by intercepting a shock to be transferred to a body of an excavator and alleviating vibration and noise.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An undercarriage having a shock-absorption function, comprising:
   a pair of roller frames (20) facing each other;
   a main frame (50) disposed between the roller frames (20);
   a bridge (40) for connecting the main frame (50) to the roller frame (20); and
   wherein the bridge is a shock absorption bridge (40) having a stacked structure in which a plurality of vibration-proof rubber plates (40-2) for bridge and a plurality of steel plates (40-3) are alternately stacked, and
   wherein the pair of roller frames (20) include a plurality of vibration-proof rollers (10) inside thereof, at a lower portion thereof, and the vibration-proof rollers comprise a cylindrical roller body (10-6), a roller shaft (10-5)

installed to pass through a center portion of the roller body (10-6), a collar unit (10-1) disposed on both sides of the roller shaft (10-5) and processed to have dove-tails at its end portions, a nut (10-3) for supporting the dove-tails of the collar unit (10-1) and fixing the vibration-proof roller (10), a bolt (10-2) associated with the vibration-proof roller (10) through the nut (10-3), and a vibration-proof rubber (10-4) for roller interposed between the collar unit (10-1) and the nut (10-3).

2. The undercarriage according to claim 1, wherein the main frame (50) is fully equipped a turn table (70) at a center portion thereof, and the turn table (70) is installed at a center portion of the main frame (50) and a vibration-proof rubber (70-1) for turn table is interposed between the turn table (70) and the main frame (50).

3. An undercarriage having a shock-absorption function, comprising:
- a pair of roller frames (20) facing each other;
- a main frame (50) disposed between the roller frames (20);
- a bridge for connecting the main frame (50) to the roller frame (20); and wherein the pair of roller frames (20) includes a plurality of vibration-proof rollers (10) inside thereof, at a lower portion thereof, and wherein the vibration-proof rollers (10) comprise a cylindrical roller body (10-6), a roller shaft (10-5) installed to pass through a center portion of the roller body (10-6), a collar unit (10-1) disposed on both sides of the roller shaft (10-5) and processed to have dove-tails at its end portions, a nut (10-3) for supporting the dove-tails of the collar unit (10-1) and fixing the vibration-proof roller (10), a bolt (10-2) associated with the vibration-proof roller (10) through the nut (10-3), and a vibration-proof rubber (10-4) for roller interposed between the collar unit (10-1) and the nut (10-3).

4. The undercarriage according to claim 3, wherein the main frame (50) is fully equipped a turn table (70) at a center portion thereof, and the turn table (70) is installed at a center portion of the main frame (50) and a vibration-proof rubber (70-1) for turn table is interposed between the turn table (70) and the main frame (50).

* * * * *